July 13, 1937.   L. E. BARTON   2,086,892
FREQUENCY MONITORING DEVICE
Filed March 28, 1936
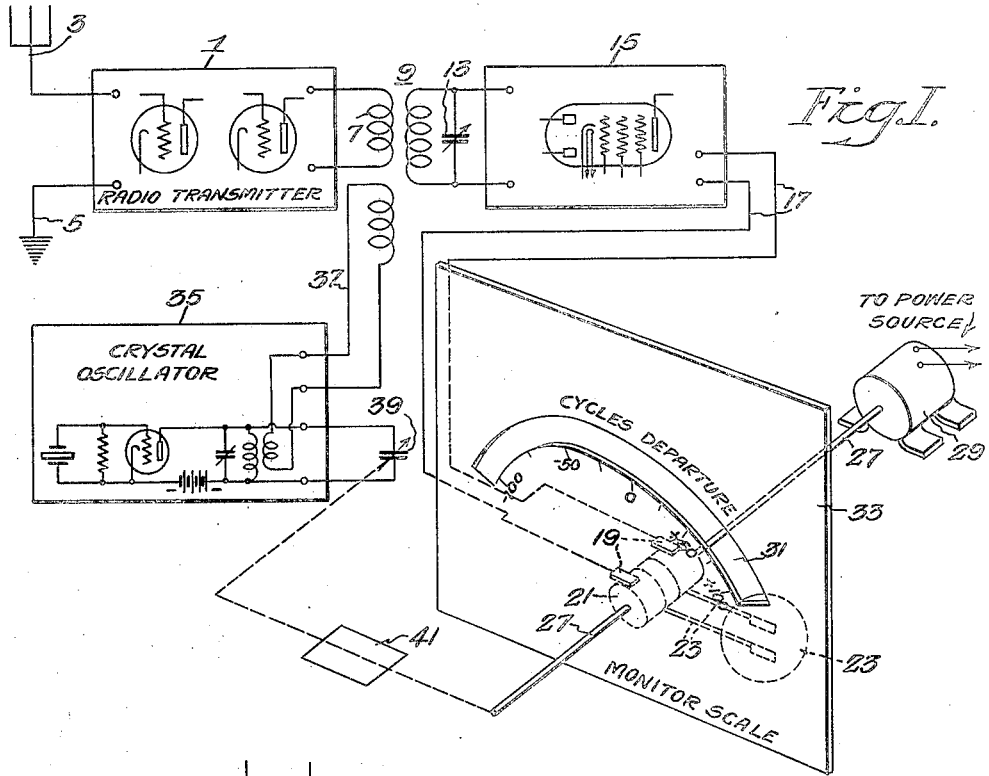
Fig. I.
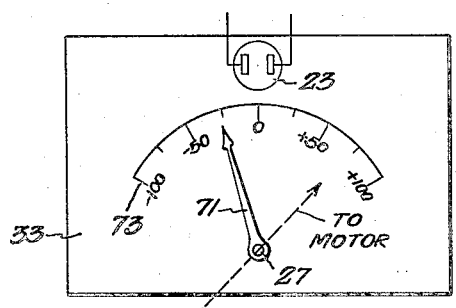
Fig. II.
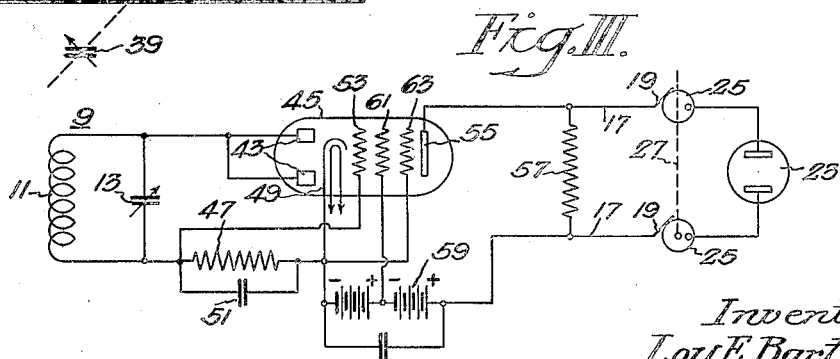
Fig. III.
Inventor
Loy E. Barton
by
Attorney Patented July 13, 1937

2,086,892

UNITED STATES PATENT OFFICE 2,086,892

FREQUENCY MONITORING DEVICE

Loy E. Barton, Collingswood, N. J., assignor to Radio Corporation of America, a corporation of Delaware Application March 28, 1936, Serial No. 71,352

9 Claims. (Cl. 250—39)

My invention relates to a frequency monitoring device. More particularly, my invention is a visual indicator or monitor which flashes a light on a suitable scale to indicate directly departures from an assigned frequency.

Governmental control of radio communication includes the assignment of channels or frequencies for transmitters. If such transmitters were permitted to materially deviate from their assigned frequencies, interference may result because the next adjacent channel may be occupied by another transmitter. By way of example between 1500 kilocycles and 550 kilocycles there have been assigned 95 channels which are each 10 kilocycles wide. Since the carriers and their side bands of each transmitter require the full channel width, it is apparent that even small departures are apt to cause undesirable interference.

Departures of 50 cycles from assigned frequencies have been the maximum which are permitted by the U. S. Government. More recently a 10 cycle departure has been proposed as the permissible tolerance. An accurate monitor is essential to insure operation of a transmitter within 10 cycles of an assigned frequency of 1,000,000 cycles.

The apparatus of my invention will visually indicate departures in the order of 3 cycles or more. Furthermore, the indication may be in the nature of a red warning light to attract the attention of the engineer in charge of the transmitter. One of the objects of my invention is to visually and automatically indicate small frequency departures of a radio transmitter. Another object is to make such indication in the form of a warning signal to attract the attention of the engineer operating the transmitter. An additional object is to use the same crystal frequency for the transmitter and the monitor oscillators.

Referring to the accompanying drawing, Figure I represents a schematic diagram of one embodiment of my invention applied to a radio transmitter, Figure II is an elevational view showing a modification of the indicating scale of Figure I, Figure III is a circuit diagram of the detector amplifier used in the system.

In Figure I, a conventional radio transmitter has been represented by the block 1. The transmitter is connected to antenna 3 and ground 5 in the conventional manner. The transmitter may be modulated by television, telephonic or telegraphic signals. A pick-up coil 7 is coupled to a carrier frequency circuit in the transmitter 1. The pick-up coil 7 is coupled to a tunable circuit 9 which is comprised of an inductor 11, and capacitor 13. The tunable circuit 9 is made resonant to the frequency of the carrier currents.

The terminals of the tunable circuit are coupled to a detector and amplifier represented by the numeral 15. The amplifier output is connected by leads 17 to a pair of brushes 19 which bear on slip rings 21. A neon tube 23 is connected by supporting wires 25 to the slip rings. The supporting wires are sufficiently rigid to firmly support the neon tube.

The slip rings 21 are suitably insulated from a shaft 27 which is coupled to a small motor 29. The motor rotates the shaft 27 so that the flashing of the neon tube, which will cover a relative short time interval will appear as a flash, a series of flashes or a continuous indication. It should be understood that the tube 23 is rotated behind a slot 31 in the scale member 33. A scale, indicating cycles departure, is formed around the slot. The operation of the neon tube will be more fully described below.

A crystal controlled oscillator is represented by the schematic diagram within block 35. This crystal must be carefully regulated with respect to temperature to insure a very accurate standard of frequency. This frequency is normally maintained at exactly the carrier frequency. The coupling between the crystal oscillator 35 and the transmitter 1 is maintained loosely enough to prevent "locking". That is, loose coupling prevents either oscillator from pulling the other into step. The coupling circuit is represented by the link 37.

A small vernier capacitor 39 is connected across the crystal output circuit or other means may be used to produce slight variations of the crystal oscillator frequency. The vernier capacitor 39 is preferably made with rotor plates which permit continuous rotation. It will be understood by those skilled in the art that the varying vernier capacitor 39 will be the means of establishing a beat note between the transmitter carrier frequency and the crystal oscillator frequency which normally operate at the same frequency. The normal vernier setting, about the mid-point of its capacity range, produces a zero beat between the two oscillators. The vernier capacitor shaft is connected to the shaft 27 carrying the slip rings through a suitable coupling means 41. The relative position between the tube 23 and the scale 33 may be established by adjusting the crystal oscillator frequency so that the "0" position of the lamp 23 on the indicator scale will correspond with the desired or assigned frequency. After this adjustment has been made the vernier capacitor and the neon tube indication will remain fixed with respect to each other because they are driven from the same common shaft.

Before describing the operation of my invention, I shall describe the detector-amplifier 15 which is illustrated in Figure III. Similar reference numerals will be used to indicate similar parts of the several figures. The terminals of the tuned circuit 9 are respectively connected to a pair of anodes 43 in the thermionic tube 45, and to the load resistor 47 which is connected to the cathode 49. The load resistor is by-passed by a capacitor 51 which has a low reactance for audio frequency currents. The lower terminal of the tuned circuit 9 is connected to the control grid 53 of thermionic tube 45. The anode 55 of this tube is connected through the anode circuit resistor 57 to the positive terminal of the B battery 59. The negative terminal of the B battery is connected to the cathode 49. The screen grid 61 is connected to a positive terminal of the B battery 59. Suppressor grid 63 is joined to the cathode 49. The output of the detector amplifier is represented as leads 17—17 which have been previously described as connecting to brushes 19. These brushes bear on the slip rings 25—25 to which the neon tube 23 is connected.

In the operation of the monitor, first assume the transmitter is in operation and the crystal oscillator is turned off. The carrier currents from the transmitter will induce currents in the tuned circuit 9. These currents are rectified by the diode rectifier 43—49. The rectified currents in the load resistor 47 develop a steady voltage across the load resistor. This steady voltage makes the control grid 53 negative with respect to cathode 49. The negative grid blocks or partially blocks the anode current in the anode circuit 49, 55, 57, 59. Since there is either no current or a very small current flowing through the resistor 57, there will be no voltage drop across the resistor 57 or current available to light the neon tube 23.

Now, assume the oscillator 35 is energized and the motor 29 started, the vernier 39 will move through the zero beat position and will set up beat notes at an audio frequency. During the zero beat intervals, the steady voltage across the diode load resistor 47 will drop to zero or a very low value. Concurrently the bias voltage on the control grid 53 will be reduced, and anode current will flow through the resistor 57. The voltage drop across resistor 57 will be sufficient to flash the neon tube 23. Since the crystal oscillator and the neon tube 23 were adjusted so that the neon tube was at the "0" scale position for the assigned or desired frequency, the neon tube will continue to flash each time it passes through the "0" position provided the desired frequency is maintained by the transmitter.

In the arrangement illustrated, the neon tube will flash twice per revolution; one flash at the "0" position, if the carrier frequency has not deviated; and a second flash at a 180° position with respect to the first flash. The second flash may be hidden by the scale member 33. Instead of continuously rotating the vernier capacitor rotor element and the neon lamp, any suitable mechanical motion may be interposed between the motor 29 and either or both of the other moving elements to oscillate the vernier and lamp through 180 or any other angle. For example, a crank movement, a cam and cam follower, an electrically operated reversing mechanism or the like may be used. If oscillatory movement is used the zero beat position will render two flashes on the scale position, when the carrier frequency is maintained. For either rotary or oscillatory movement, if the transmitter carrier drifts, the zero beat position will no longer occur at "0" scale position. The zero beat position will shift with respect to the scale the number of cycles plus or minus (+ or −) which the carrier has deviated. In the several different apparatus arrangements which are within the scope of my invention, care must be exercised in each application to carefully regulate the crystal oscillator 35. If this oscillator deviates, the accuracy of the indicator becomes questionable. Since very precise crystal oscillators are now available, this difficulty does not limit the accuracy required in present day broadcasting transmitters.

My invention is not limited to the precise means shown. Numerous departures, within the scope of my invention, may be made in the system and method described. For example, in Figure II the neon light 23 may be mounted in a fixed position to shine on the scale member 33, and a pointer 71 revolved or oscillated over a suitable scale 73. The pointer 71 is mounted on the motor shaft 27 which is coupled to the shaft of the vernier 39 as previously described. The effect of the intermittent illumination of the scale 73 by the neon tube will indicate the pointer 71 as stationary in the well known stroboscopic manner.

I claim as my invention:

1. In an apparatus for indicating frequency drift of a high frequency carrier current, a source of high frequency oscillatory currents of a frequency equal to the said carrier frequency, means for varying the frequency of the currents of said source through an audio frequency range including zero beat with respect to said first mentioned carrier, a detector, means for impressing currents from said first mentioned carrier and said source on said detector, an amplifier including an output circuit and a light indicator connected across said output circuit, and circuit connections between said detector and said amplifier whereby said audio frequency currents extinguish said light indicator and zero beat currents illuminate said light indicator.

2. In a device of the character of claim 1 a scale, a motor connected to rotate said light indicator and said means for varying the frequency of said source whereby the two are rotated together with respect to said scale.

3. An apparatus for indicating the frequency drift of a carrier current comprising means for generating a carrier frequency current, means for detecting said carrier frequency currents, an amplifier connected to said detector means, means for blocking the amplifier output current, a constant source of radio frequency current of a frequency corresponding to said carrier frequency currents, means for varying the frequency of said constant source through a zero beat position to generate beat frequency currents by the interactions of said carrier frequency currents and said radio frequency current, means coupling said source to said detector, a light indicator connected to said amplifier output circuit, means for rotating said light indicator and means mechanically coupling said rotating light and said frequency varying means, whereby said zero beat currents light said indicator at the rotation position corresponding to zero beat.

4. A device of the character of claim 3 including a scale traversed by said indicator to indicate frequency drift.

5. An apparatus for indicating frequency drift which comprises, in combination, a generator of high frequency currents whose frequency is to be monitored, a second generator of high frequency current of the same frequency as said first mentioned generator, a rectifier, means for impressing current from both generators on said rectifier to generate a substantially steady biasing voltage, an amplifier responsive to said bias voltage and having a normally non-illuminated neon tube in its output circuit, means for varying the frequency of said second generator with respect to said first generator whereby beat frequency currents are developed in said rectifier and whereby a zero beat current reduces said bias voltage and permits illumination of said neon tube and means for concurrently varying said second generator frequency and the position of said neon tube so that the position at which said neon tube is illuminated varies with said second generator frequency variation to indicate frequency drift of the first mentioned generator.

6. In a device of the character of claim 5 a scale member graduated to indicate the frequency departure of said first mentioned generator, and an opening adjacent said scale through which said lamp is visible.

7. In a device of the character of claim 1, a scale, a pointer, a motor coupled to said means for varying the frequency of said source and to said pointer, and means positioning said light indicator with respect to said scale to stroboscopically illuminate said scale and pointer.

8. An apparatus for indicating frequency drift which comprises, in combination, a generator of high frequency currents whose frequency is to be monitored, a second generator of high frequency current of the same frequency as said first mentioned generator, a rectifier, means for impressing current from both generators on said rectifier to generate a substantially steady biasing voltage, an amplifier responsive to said bias voltage and having a normally non-illuminated neon tube in its output circuit, means for varying the frequency of said second generator with respect to said first generator whereby beat frequency currents are developed in said first rectifier and whereby a zero beat current reduces said bias voltage and permits illumination of said neon tube, a scale, a pointer movably mounted with respect to said scale, means for concurrently moving said pointer and said frequency varying means, and means positioning said neon tube so that its illumination stroboscopically illuminates said scale and pointer.

9. The method of indicating frequency drift of a carrier current by means of a light indicator, rectifier, and amplifier which comprises generating a reference carrier current of the same frequency as the frequency of the current to be observed, generating audio frequency beats, including zero beat between said currents, rectifying said currents, biasing said amplifier to cut off by said audio frequency beats, biasing said amplifier by said zero beat current to illuminate said neon tube, and stroboscopically indicating any variation of said zero beat current.

LOY E. BARTON.